US012608227B2

(12) United States Patent
Zad Tootaghaj et al.

(10) Patent No.: US 12,608,227 B2
(45) Date of Patent: Apr. 21, 2026

(54) JOB ALLOCATIONS TO GRAPHICS PROCESSING UNITS WITH TENANT ISOLATION

(71) Applicant: HEWLETT PACKARD ENTERPRISE DEVELOPMENT LP, Spring, TX (US)

(72) Inventors: Diman Zad Tootaghaj, Milpitas, CA (US); Yunming Xiao, Milpitas, CA (US); Aditya Dhakal, Milpitas, CA (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 432 days.

(21) Appl. No.: 18/299,855

(22) Filed: Apr. 13, 2023

(65) Prior Publication Data

US 2024/0345875 A1     Oct. 17, 2024

(51) Int. Cl.
*G06F 9/48* (2006.01)
*G06F 9/50* (2006.01)

(52) U.S. Cl.
CPC .......... *G06F 9/4881* (2013.01); *G06F 9/4856* (2013.01); *G06F 9/5027* (2013.01)

(58) Field of Classification Search
CPC ..... G06F 9/4881; G06F 9/4856; G06F 9/5027
USPC ....................................................... 718/104
See application file for complete search history.

(56) References Cited

U.S. PATENT DOCUMENTS

| | | | | |
|---|---|---|---|---|
| 9,128,739 | B1 * | 9/2015 | Juels ................... | G06F 9/45558 |
| 10,313,261 | B1 * | 6/2019 | Walton, III .......... | H04L 41/145 |
| 10,325,343 | B1 * | 6/2019 | Zhao ................... | H04L 67/1042 |
| 10,430,991 | B2 | 10/2019 | Ma et al. | |
| 11,055,809 | B2 | 7/2021 | Shah et al. | |
| 11,449,963 | B1 * | 9/2022 | Beeler ..................... | H04L 69/04 |
| 11,651,470 | B2 | 5/2023 | Zad Tootaghaj et al. | |
| 2004/0194055 | A1 * | 9/2004 | Galloway ................. | G06F 8/76 |
| | | | | 717/101 |
| 2010/0287560 | A1 * | 11/2010 | Neft ....................... | G06F 9/4856 |
| | | | | 718/104 |
| 2011/0041131 | A1 * | 2/2011 | Srivatsa ................ | G06F 9/4812 |
| | | | | 718/102 |
| 2012/0017213 | A1 * | 1/2012 | Hunt ....................... | G06F 21/53 |
| | | | | 718/100 |
| 2012/0130554 | A1 * | 5/2012 | Jain ....................... | G06F 9/5094 |
| | | | | 700/291 |
| 2012/0254439 | A1 * | 10/2012 | Yamasaki ............... | G06F 9/505 |
| | | | | 709/226 |

(Continued)

OTHER PUBLICATIONS

DPDK Project, About DPDK downloaded Jun. 22, 2024 (5 pages).

(Continued)

*Primary Examiner* — Adam Lee
(74) *Attorney, Agent, or Firm* — Trop, Pruner & Hu, P.C.

(57) ABSTRACT

In some examples, a system including physical graphics processing units (GPUs) receives a request to schedule a new job to be executed in the system that is accessible by a plurality of tenants to use the physical GPUs. The system allocates the new job to a collection of vGPUs of the physical GPUs based on an operational cost reduction objective to reduce a cost associated with a usage of the physical GPUs and based on a tenant isolation constraint to provide tenant isolation wherein a single tenant of the plurality of tenants is to use a physical GPU at a time.

18 Claims, 4 Drawing Sheets

(56) References Cited

U.S. PATENT DOCUMENTS

| | | | |
|---|---|---|---|
| 2013/0238785 A1* | 9/2013 | Hawk | G06F 9/5072 709/224 |
| 2013/0275382 A1* | 10/2013 | Chi | G01N 15/1404 707/654 |
| 2014/0298338 A1* | 10/2014 | Doi | G06F 9/5016 718/1 |
| 2015/0039793 A1* | 2/2015 | Rossetti | H04L 49/90 710/105 |
| 2015/0052531 A1* | 2/2015 | Helak | G06F 9/4856 718/102 |
| 2016/0019937 A1* | 1/2016 | Arora | G11C 13/0004 365/163 |
| 2016/0077871 A1* | 3/2016 | Kaplan | G06F 1/3246 718/102 |
| 2016/0246625 A1* | 8/2016 | Katsura | G06F 9/5077 |
| 2017/0255496 A1* | 9/2017 | Deng | G06F 9/5027 |
| 2018/0060996 A1* | 3/2018 | Tunuguntla | G06F 9/45558 |
| 2018/0089881 A1* | 3/2018 | Johnson | G06F 9/45558 |
| 2018/0373570 A1 | 12/2018 | Xu et al. | |
| 2019/0050163 A1* | 2/2019 | Dewey | G06F 3/0686 |
| 2019/0324822 A1 | 10/2019 | Gottin et al. | |
| 2020/0019311 A1* | 1/2020 | Zolotow | G06F 3/067 |
| 2020/0090001 A1* | 3/2020 | Zargahi | G06V 10/96 |
| 2020/0219464 A1* | 7/2020 | Callway | G09G 3/3406 |
| 2020/0409733 A1* | 12/2020 | Sankaran | G06F 9/5077 |
| 2021/0004273 A1* | 1/2021 | You | G06F 9/5066 |
| 2021/0026672 A1* | 1/2021 | Kurkure | G06F 9/5083 |
| 2021/0026696 A1* | 1/2021 | Chen | G06F 9/5022 |
| 2021/0110506 A1 | 4/2021 | Prakash et al. | |
| 2021/0216365 A1 | 7/2021 | Zhao et al. | |
| 2021/0216375 A1* | 7/2021 | Sivaraman | G06N 3/063 |
| 2021/0256418 A1 | 8/2021 | Creedon et al. | |
| 2021/0373972 A1* | 12/2021 | Kurkure | G06F 9/5044 |
| 2022/0091894 A1* | 3/2022 | Xia | G06F 9/5027 |
| 2022/0188965 A1* | 6/2022 | Li | G06F 9/4881 |
| 2022/0229701 A1* | 7/2022 | Zhang | G06F 9/5077 |
| 2022/0237014 A1 | 7/2022 | Kurkure et al. | |
| 2022/0414817 A1 | 12/2022 | Zad Tootaghaj et al. | |
| 2023/0089925 A1 | 3/2023 | Cho et al. | |
| 2023/0099950 A1* | 3/2023 | Porter | G06F 1/324 718/104 |
| 2023/0102063 A1* | 3/2023 | Wong | G06F 9/5044 718/102 |
| 2023/0155958 A1* | 5/2023 | An | H04L 47/783 709/226 |
| 2023/0195972 A1* | 6/2023 | Desai | G06F 9/4887 703/8 |
| 2023/0297406 A1* | 9/2023 | Rogers | G06F 9/45558 |
| 2023/0297421 A1* | 9/2023 | Cowperthwaite | G06F 9/5055 718/102 |
| 2023/0418467 A1* | 12/2023 | Ezrielev | G06F 3/067 |
| 2023/0418826 A1* | 12/2023 | Tanigawa | G06F 16/24565 |
| 2024/0056491 A1* | 2/2024 | Kamaraju | H04L 65/765 |

OTHER PUBLICATIONS

Github, alibaba/clusterdata, clusterdata/cluster-trace-gpu-v2020 downloaded Jun. 22, 2024 (20 pages).
Github, AliyunContainerService / gpushare-device-plugin, GPU Sharing Device Plugin for Kubernetes Cluster downloaded Jun. 22, 2024 (2 pages).
Github, Deepomatic / shared-gpu-nvidia-k8s-device-plugin downloaded Jun. 22, 2024 (5 pages).
Github, intel/linux-intel-its downloaded Jun. 22, 2024 (5 pages).
Google for Developers, About OR-Tools, Jan. 2023 (2 pages).
Hsu et al., Simultaneous and Heterogenous Multithreading, Micro '23, Oct. 28-Nov. 1, 2023 (16 pages).
Imagenet, About ImageNet downloaded Jun. 22, 2024 (2 pages).
Kubernetes, Manage clusters with different types of GPUs downloaded Jun. 22, 2024 (3 pages).
Marvell, Marvell LiquidIO III, Sep. 2020 (3 pages).

Nvidia Bluefield-3 DPU Programmable Data Center Infrastructure On-A-Chip, Dec. 2021 (2 pages).
Nvidia Bluefield-3 Networking Platform Datasheet, Nov. 2023 (2 pages).
Nvidia Converted Accelerators downloaded Jun. 22, 2024 (8 pages).
Nvidia DOCA Comm Channel, Programming Guide, May 2023 (31 pages).
Nvidia DOCA DMA docs downloaded Jun. 22, 2024 (16 pages).
Nvidia DOCA RDMA downloaded Jun. 22, 2024 (59 pages).
Nvidia GPUDirect, Enhancing Data Movementand Access for GPUs downloaded Jun. 22, 2024 (5 pages).
Nvidia Mellanox Innova-2 Flex Open Programmable SmartNIC downloaded Jun. 22, 2024 (6 pages).
Nvidia Multi-Instance GPU User Guide, Mar. 2024 (58 pages).
Nvidia, Multi-Process Service, Feb. 2024 (38 pages).
Nvidia, Nvidia Bluefield-2 DPU Datasheet, Data Center Infrastructure on a Chip, Nov. 2023 (2 pages).
Tootaghaj et al., U.S. Appl. No. 18/299,855 entitled Job Allocations to Graphics Processing Units With Tenant Isolation filed Apr. 13, 2023 (38 pages).
Tootaghaj et al., U.S. Appl. No. 18/765,440 entitled Job Allocations to Fractions of Parallel Processing Units (PPUs) filed Jul. 8, 2024 (63 pages).
Tootaghaj et al., U.S. Appl. No. 18/765,445 entitled DMA Transfers of Job Data From an Adapter to Parallel Processing Unit (PPU) Fractions filed Jul. 8, 2024 (64 pages).
Cho et al., SLA-Driven ML Inference Framework for Clouds with Heterogeneous Accelerators, Proceedings of Machine Learning and Systems (MLSys), 2022, 13 pages.
Crankshaw et. al., "Clipper: A low-latency online prediction serving system." NDSI, 2017, 17 pages.
Dakkak et. al., "Trims: Transparent and isolated model sharing for low latency deep learning inference in function-as-a-service." Cloud, 2018, 13 pages.
Devlin et al., "BERT: Pre-training of Deep Bidirectional Transformers for Language Understanding", 2019, 16 pages.
Hayashi et al., "ESPnet-TTS: Unified, Reproducible, and Integratable Open Source End-to-End Text-to-Speech Toolkit", 2020, 5 pages.
He et al., "Deep Residual Learning for Image Recognition", In Proceedings of the IEEE conference on computer vision and pattern recognition, 2016, 9 pages.
Junguk, et al., "SLA-Driven ML Inference Framework For Clouds With Heterogeneous Accelerators." Proceedings of Machine Learning and Systems 4 (2022), 13 pages.
Murray, et al., "tf. data: a machine learning data processing framework", Proceedings of the VLDB Endowment, 2021, 16 pages.
Nvidia Corporation, "Nvidia TensorRT", available online at <https://web.archive.org/web/20230921054928/https://developer.nvidia.com/tensorrt>, Sep. 21, 2023, 5 pages.
Nvidia, "Nvidia Triton Inference Server", available online at <https://docs.nvidia.com/deeplearning/triton-inference-server/user-guide/docs/index.html>, Jan. 18, 2024, 2 pages.
Paras Jain et. al., "Dynamic Space-Time Scheduling for GPU Inference." arXiv preprint, 2018, 9 Pages.
Paras Jain et. al., "The OoO VLIW JIT Compiler for GPU Inference." arXiv preprint, 2019, 7 pages.
Romero et al., "INFaaS: A Model-less and Managed Inference Serving System", Dec. 15, 2020, 16 pages.
Sapio et al., "Scaling Distributed Machine Learning with In-Network Aggregation", Proceedings of the 18th USENIX Symposium on Networked Systems Design and Implementation, 2021, 25 pages.
Sengupta et. al., "Multi-tenancy on GPGPU-based servers." 7th international workshop on Virtual-ization technologies in distributed computing, 2013, 8 Pages.
Skolnick et al., "AlphaFold 2: Why It Works and Its Implications for Understanding the Relationships of Protein Sequence, Structure, and Function", 2021, 8 pages.
Weng et al., "MLaaS in the Wild:Workload Analysis and Scheduling in Large-Scale Heterogeneous GPU Clusters", Apr. 4-6, 2022, 17 pages.
Xiao et al., "Conspirator: SmartNIC-Aided Control Framework for ML Workloads Orchestration", 2023, 6 pages.

(56)         References Cited

OTHER PUBLICATIONS

Yeh et. al., "Pagoda: Fine-grained gpu resource virtualization for narrow tasks." CM SIGPLAN Notices, 2017, 13 pages.

Zhou, et al., "Deep interest network for click-through rate prediction", In Proceedings of the 24th ACM SIGKDD international conference on knowledge discovery data mining, 2018, 9 pages.

Deepomatic, Fork of the Nvidia device plugin for Kubernetes with support for shared GPUs by declaring GPUs multiple times downloaded Feb. 6, 2023 (6 pages).

Github, AliyunContainerService / gpushare-device-plugin, GPU Sharing Device Plugin in Kuberntes downloaded Feb. 6, 2023 (2 pages).

Intel, CPU vs. GPU: Making the Most of Both downloaded Feb. 6, 2023 (4 pages).

Nvidia, Multi-Process Service, Oct. 2022 (37 pages).

Schedule GPUs_Kubernetes last modified Oct. 18, 2022 (3 pages).

Wikipedia, CUDA, Stable release: 12.1.0 / Mar. 1, 2023 (23 pages).

* cited by examiner

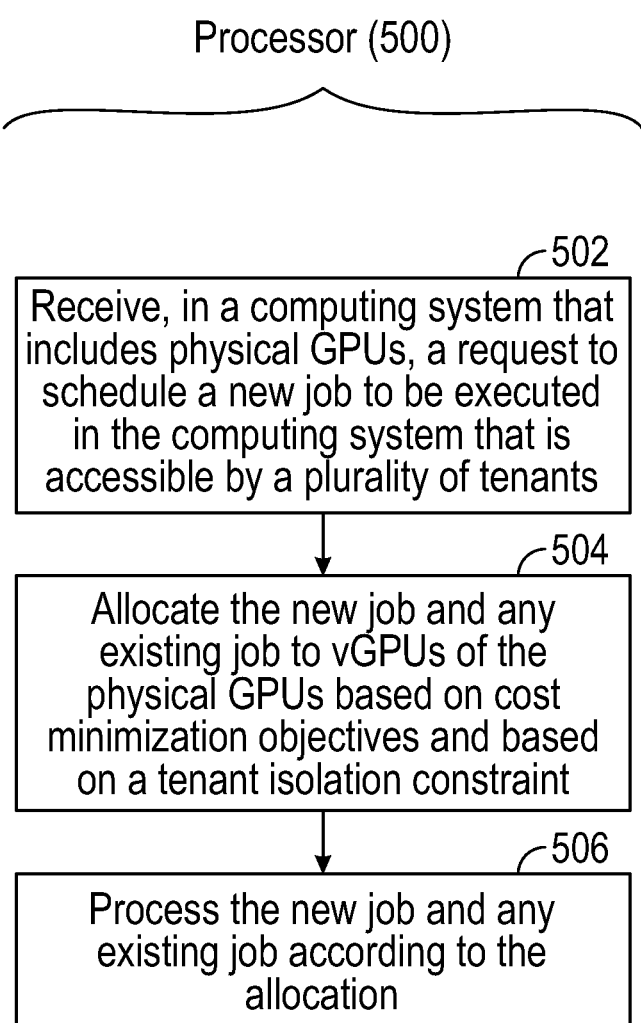

Processor (500)

502

Receive, in a computing system that includes physical GPUs, a request to schedule a new job to be executed in the computing system that is accessible by a plurality of tenants

504

Allocate the new job and any existing job to vGPUs of the physical GPUs based on cost minimization objectives and based on a tenant isolation constraint

506

Process the new job and any existing job according to the allocation

FIG. 5

JOB ALLOCATIONS TO GRAPHICS PROCESSING UNITS WITH TENANT ISOLATION

BACKGROUND

Some computing systems include graphics processing units (GPUs) to perform computations for workloads. A GPU is a type of processing device that is able to execute machine-readable instructions.

BRIEF DESCRIPTION OF THE DRAWINGS

Some implementations of the present disclosure are described with respect to the following figures.

FIG. 5 is a flow diagram of a scheduling process according to some examples.

Figure 1:
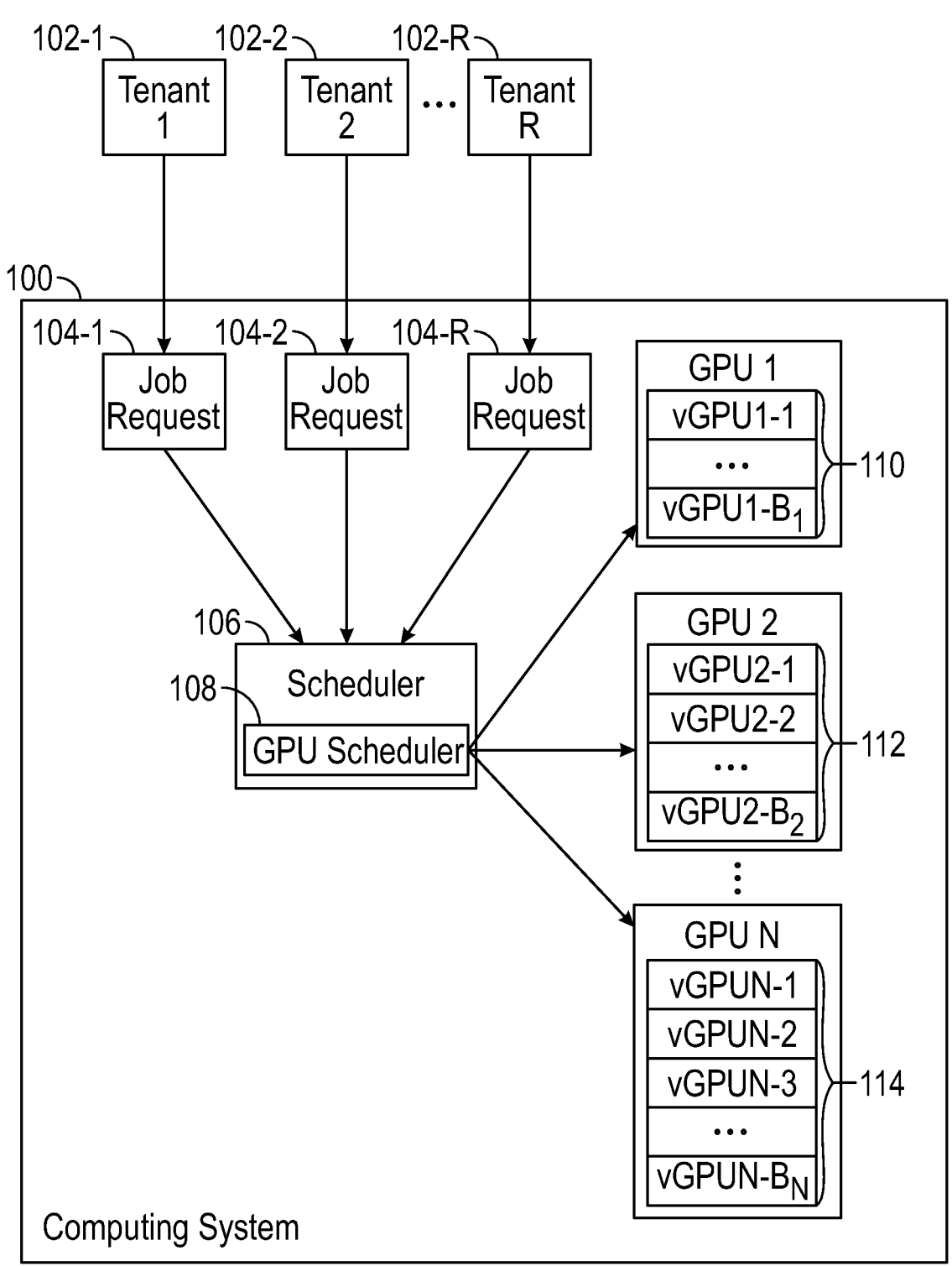
FIG. 1 is a block diagram of an arrangement including a computing system with a graphics processing unit (GPU) scheduler and multiple tenants, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some computing systems employ a model of GPU assignment in which just one process (e.g., a process of an application program or another type of program) can use a GPU at a given time. For example, a model of GPU assignment can be an exclusive GPU assignment model in which a single process is assigned to a GPU, or a time-multiplexed GPU assignment model in which time multiplexing is used to define time intervals during which respective processes can be assigned to a GPU. In either the exclusive GPU assignment model or the time-multiplexed GPU assignment model, a GPU is allocated to a single process at a given time.

Examples of computing systems that employ the foregoing models of GPU assignment include computing systems that include container platforms. In a container platform (e.g., a Kubernetes platform), programs are run in containers, which are virtualized computing environments that are isolated from one another.

Since GPU compute capability is typically underutilized by a single program, this may result in GPU resources going underutilized if either the exclusive GPU assignment model or the time-multiplexed GPU assignment model is used. Also, sharing a GPU using time-multiplexing can be inefficient.

Some GPUs allow multiple processes to be processed concurrently on the same GPU to improve sharing of GPU resources by multiple processes. For example, GPUs that support a Multi-Process Service (MPS) can efficiently share a GPU by multiple processes. For example, a GPU that supports MPS can concurrently execute the work of multiple programs.

In some examples, GPUs can be provided as-a-Service (aaS). For example, GPUs are resources that can be provided as a cloud service. A cloud service can have multiple tenants. A "tenant" refers to a group of users, such as users associated with an enterprise (e.g., a business concern, a government agency, an educational organization, a charitable organization, an individual, etc.), that is able to use resources (e.g., GPUs) owned or managed by another entity (referred to as a "service provider").

Cloud services can support multi-tenancy, in which multiple tenants can access services (e.g., GPU resources) provided by a service provider. Service providers in multi-tenant environments face a challenge that includes providing security and performance isolation for users of multiple tenants that execute jobs on a shared physical environment, including shared GPUs. Jobs of a first tenant may cause resources to be unavailable or insufficient for a second tenant, which can lead to long wait times or long execution times for jobs of the second tenant. Also, security can be an issue in a multi-tenant environment if the data of one tenant is not sufficiently protected from unauthorized access by another tenant sharing the same physical environment.

In accordance with some implementations of the present disclosure, a GPU scheduling system is provided that schedules jobs on GPU resources in a way that allows multiple jobs to be concurrently executed on a GPU while satisfying a tenant isolation constraint in a multi-tenant environment and a cost reduction objective that seeks to reduce (e.g., minimize) costs associated with the execution of jobs on GPUs.

The GPU resources to which jobs can be allocated include virtual GPUs (vGPUs). A physical GPU that supports GPU virtualization can be divided into X vGPUs, where X is a natural number that is configurable in a programming model according to some examples of the present disclosure. For example, the maximum number of vGPUs for a physical GPU from NVIDIA Corporation depends on whether the physical GPU has a Volta or a pre-Volta architecture.

Although reference is made to NVIDIA GPUs in some examples, it is noted that GPUs from other manufacturers can also be employed in examples of the present disclosure.

Tenant isolation is provided by preventing the sharing of a physical GPU by multiple tenants. Costs that are to be reduced (e.g., minimized) can include operational costs and migration costs. An operational cost can be based on how many physical GPUs are used (e.g., are powered on, actively being used, or otherwise not in an idle or quiescent state). A migration cost is associated with migrating a job between physical GPUs. A "job" can refer to any collection of data processing tasks. As used here, a "collection" of items can refer to a single item or multiple items. Thus, a collection of data processing tasks can include a single data processing task or multiple data processing tasks.

FIG. 1 is a block diagram of an arrangement including a computing system 100 according to some examples of the present disclosure. The computing system 100 provides computing resources accessible by users of multiple tenants 102-1, 102-2, ... 102-R, where R is a natural number greater than or equal to 2. For example, the computing system 100 can include resources that are provided as-a-Service (aaS), such as in a cloud or another infrastructure environment. The resources of the computing system 100 are available to the tenants 102-1 to 102-R on demand (i.e., the resources are made available to users of the tenants 102-1 to 102-R in response to requests by the users). A "user" can refer to a human, a program (such as a containerized application program or any other type of program), or a machine (such as a computer or another type of machine).

The resources of the computing system 100 can include processing resources, communication resources, storage resources, program resources, and so forth. An example of a processing resource is a GPU. As shown in FIG. 1, the computing system 100 includes GPU 1 to GPU N, where N is the GPU index and is a natural number greater than or equal to 1. GPU 1 to GPU N are accessible by tenants on demand. Each GPU 1 to GPU N is a physical GPU, which can be divided into multiple vGPUs. Other examples of processing resources include a central processing unit (CPU), a field programmable gate array (FPGA), an application-specific circuit (ASIC), and so forth. A GPU can include a relatively large quantity of processing cores that are built to perform specialized computations. The number of processing cores of a GPU can be much greater than the number of processing cores available in a CPU.

Users of the tenants 102-1 to 102-R are able to submit respective job requests 104-1, 104-2, . . . , 104-R to the computing system 100. Each job request is to request the execution of a job on resources of the computing system 100, including GPU 1 to GPU N. As noted above, a job can refer to any collection of data processing tasks. In some examples, a job request can be included in a data structure, such as a file, e.g., a Yet Another Markup Language (YAML) file. In other examples, other types of data structures can be used for job requests. More than one job request from a given tenant can be included in one data structure, e.g., one YAML file. In further examples, a tenant can submit multiple data structures over time for more job requests that are to use the shared computing resources.

Examples of jobs that can execute using GPUs include any or some combination of the following: an artificial intelligence (AI) computing job, a machine learning (ML) job, a natural language processing (NLP) job, a machine perception job (e.g., to perform speech recognition, facial recognition, object recognition, etc.), a job associated with a neural network, or any other type of job.

A job request can request execution of a job on a GPU, or more specifically, on vGPUs of the GPU. More generally, a job request can request execution of a job using resources of the computing system 100, where the resources include GPU 1 to GPU N and possibly other resources of the computing system 100.

The job requests 104-1 to 104-R are received by a scheduler 106, which allocates a job specified by each job request to resources in the computing system 100. In some examples, the scheduler 106 may be implemented in an operating system (OS) or may be implemented in a container orchestration system (e.g., Kubernetes). More generally, the scheduler 106 may be implemented using machine-readable instructions that are executable on hardware processing circuitry, including a CPU (or multiple CPUs).

The scheduler 106 includes a GPU scheduler 108 to schedule jobs onto GPUs. Note that scheduler 106 can include schedulers for other types of resources in the computing system 100. More generally, the scheduler 106 can perform the scheduling of jobs to any combination of resources of the computing system 100, including GPUs and other resources.

GPU 1 to GPU N are able to perform concurrent processing of jobs by multiple vGPUs. In some examples, the GPUs are heterogeneous GPUs in the computing system 100 (e.g., one or more of the GPUs are different from one or more other GPUs). For example, a first collection of GPUs is produced by a first GPU manufacturer, and a second collection of GPUs is produced by a different second manufacturer. As used here, a "collection" of items can refer to a single item or multiple items. Thus, a collection of GPUs can refer to a single GPU or multiple GPUs. Configurations of GPUs from different manufacturers may be different. For example, GPUs from different manufacturers may have different processing capacities, execute with clocks of different operating speeds, support different quantities of vGPUs, and so forth. In further examples, different models of GPUs from the same manufacturer may have different configurations. The GPU scheduler 108, according to some implementations of the present disclosure, is able to provide efficient allocation of jobs to heterogeneous GPUs, while maintaining tenant isolation, reducing costs such as operational costs and migration costs, and satisfying any other constraints and/or objectives.

Multiple vGPUs of each GPU can be shared by multiple users. In some examples, GPU 1 includes a set of $B_1$ vGPUs 110 (vGPU1-1, . . . vGPU1-$B_1$), GPU 2 includes a set of $B_2$ vGPUs 112 (vGPU2-1, vGPU2-2, . . . vGPU2-$B_2$), . . . GPU N includes a set of $B_N$ vGPUs 114 (vGPUN-1, vGPUN-2, vGPUN-3, . . . vGPUN-$B_N$), where each of $B_1$, $B_2$, and $B_N$ is a natural number greater than or equal to 1. In some examples, some or all $B_1$, $B_2$, . . . . $B_N$ may have the same value. In other examples, some or all of $B_1$, $B_2$, . . . . $B_N$ may have different values. In such latter examples, the number of processing resources (vGPUs) on any GPU in the computing system 100 can differ from other GPUs in the computing system 100. In the example of FIG. 1, the computing system 100 has a total of $B=(B_1+B_2+ . . . +B_N)$ vGPUs available for processing jobs from the tenants 102-1 to 102-R.

In response to the job requests 104-1 to 104-R, the GPU scheduler 108 determines an optimal allocation of jobs to vGPUs of any or some combination of GPU 1 to GPU N. An "optimal" allocation of jobs to vGPUs refers to an allocation that satisfies objective(s) and/or constraint(s) relating to job scheduling (discussed further below).

In some examples, in response to receiving a new job request, the GPU scheduler 108 determines a new allocation of jobs to vGPUs, considering the new job's requirements and a previous allocation of existing jobs to vCPUs. In further examples, in response to a completion of an existing job, the GPU scheduler 108 determines a new allocation of jobs to vGPUs, considering the completed job's requirements and an allocation of existing jobs to vGPUs. In either case, the new allocation may result in migrating one or more existing jobs from one physical GPU to another physical GPU.

By continually reassessing the optimal allocation of jobs to vGPUs in the computing system 100, the GPU scheduler 108 prevents oversubscription of jobs to GPUs (where jobs are committed to a number of vGPUs that exceeds what is available at the GPUs), avoids GPU resource fragmentation (e.g., small quantities of unallocated vGPUs are spread out across multiple GPUs), and avoids underutilization of GPU resources. Such continued updates of job allocations to vGPUs can result in improving the overall performance of the computing system 100.

In accordance with some implementations of the present disclosure, the GPU scheduler 108 maintains tenant isolation by preventing allocating more than one tenant's job(s) on a physical GPU. In some examples, the GPU scheduler 108 can provide full tenant isolation (i.e., no two tenants should share the same physical GPU) while minimizing the migration cost and operational costs. In a more specific example, the GPU scheduler 108 can leverage GPU virtualization (e.g., the MPS capabilities of NVIDIA GPUs that have the Volta architecture). In other examples, the GPU scheduler 108 can schedule jobs onto vGPUs of GPUs from other manufacturers.

In some examples, the GPU scheduler 108 formulates a problem of optimal GPU allocation into an integer linear programming optimization problem based on input variables. The GPU scheduler 108 sends the formulation to a solver 116, which in some examples determines an optimal solution for the formulation and returns a set of output data (described below) to the GPU scheduler 108. Alternatively, the solver 116 can also implement a greedy algorithm that solves the problem sub-optimally.

In this manner, the GPU scheduler 108 performs online GPU scheduling to find a feasible solution for each GPU allocation problem iteration. The GPU scheduling is "online" in that the GPU scheduling is performed by the GPU scheduler 108 as job requests are received and/or jobs are completed.

The output data is used by the GPU scheduler 108 to implement the optimal allocation of jobs to vGPUs in the computing system 100. In some examples, the solver 116 is part of the GPU scheduler 108. In other examples, the solver 116 is separate from the GPU scheduler 108. The solver 116 is executed in the computing system 100 or another computing system (such as another computing system accessible over a network by the GPU scheduler 108). The solver 116 can be implemented with an integer linear programming solver, such as the Gurobi optimization toolkit (commercially available from Gurobi Optimization, LLC); the CPLEX Optimizer (commercially available from IBM Corporation); or the linear programming "OR" tool (available as open-source software from Google), and so forth. In further examples, the solver 116 can implement a greedy algorithm that solves the problem sub-optimally.

Figures 2A, 2B, 2C:
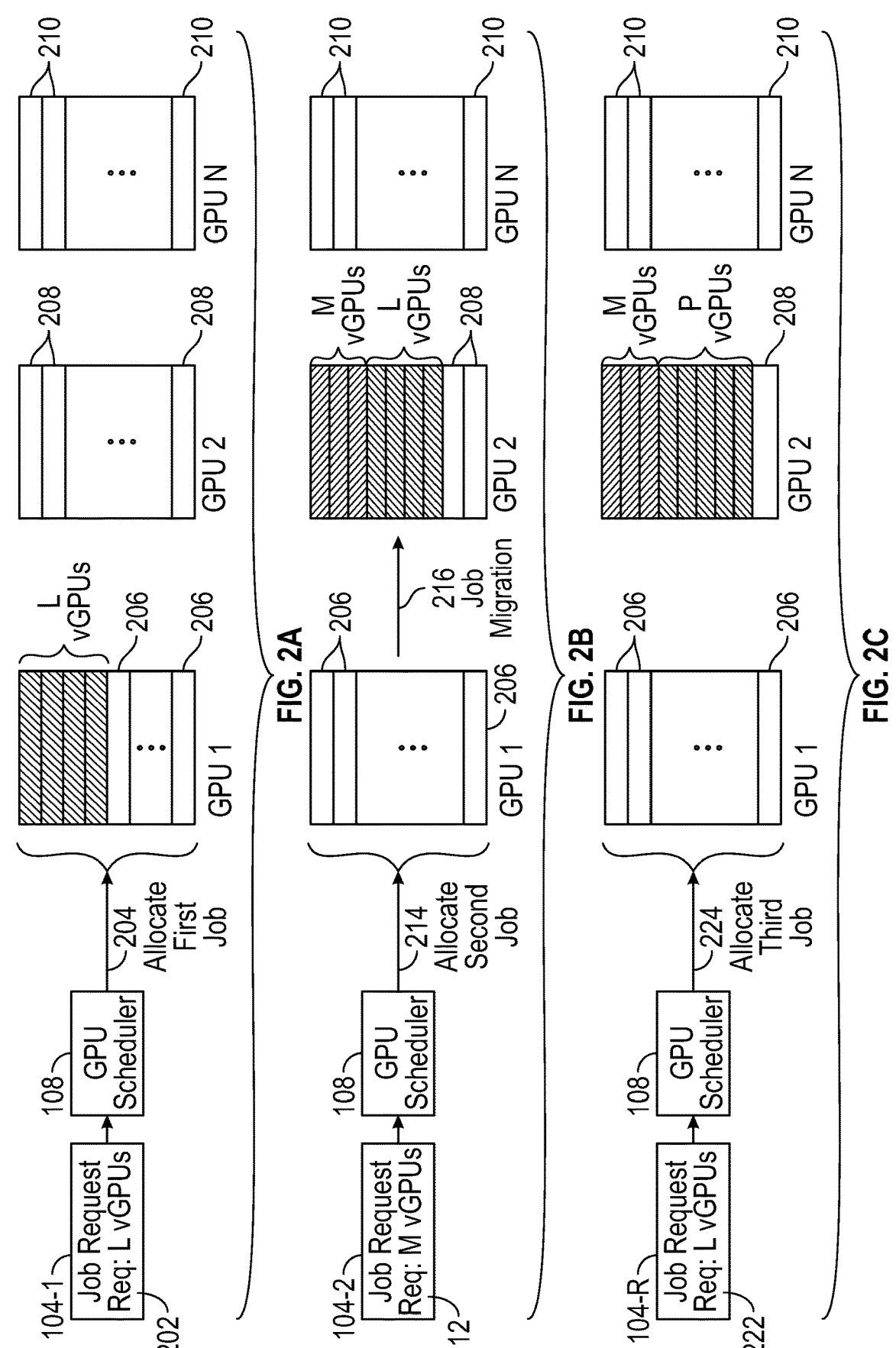
FIG. 2A-FIG. 2C illustrate the assignment of jobs to virtual GPUs (vGPUs) of physical GPUs, according to some examples.

FIG. 2A-FIG. 2C illustrate examples of allocations of jobs to vGPUs by the GPU scheduler 108, according to some examples of the present disclosure. FIG. 2A assumes an example in which the GPU scheduler 108 receives the job request 104-1 from tenant 102-1 to allocate a first job for processing by a GPU of the computing system 100. In the example, the first job has a requirement 202 of L vGPUs to perform the first job, where L is a natural number and is greater than or equal to 1. It is assumed that there is no existing job at this time. In some examples, a constraint can specify that the first job cannot be allocated to more than one physical GPU. In response to the job request 104-1, the GPU scheduler 108 allocates the first job to L vGPUs from the set of vGPUs 110, 112, or 114, while maintaining tenant isolation, satisfying the constraint that the first job cannot be allocated to more than one physical GPU, and minimizing the migration cost and operational cost for the computing system 102. In the example of FIG. 2A, the first job is allocated (at 204) to L vGPUs of GPU 1. If there is no existing job at the time of allocation of the first job, L vGPUs are in use after the allocation of the first job. After the allocation of the first job, GPU 1 has unallocated vGPUs 206, GPU 2 has unallocated vGPUs 208, and GPU N has unallocated vGPUs 210. Note that GPUs 2 and N are unused after the first job's allocation and may be powered off.

Subsequently, as shown in FIG. 2B, the GPU scheduler 108 receives the job request 104-2 from tenant 102-2 to allocate a second job for processing by the GPUs of computing system 100. The second job has a requirement 212 of M vGPUs to perform the second job, where M is a natural number and is greater than or equal to 1. In response to the job request 104-2, the GPU scheduler 108 allocates the second job to M vGPUs from the set of vGPUs 110, 112, or 114, while maintaining tenant isolation, satisfying the constraint that the second job cannot be allocated to more than one physical GPU, and minimizing the migration cost and operational cost for the computing system 102.

Note that the allocation of the second job to vGPUs considers the previous allocation of the existing first job to L vGPUs of GPU 1. Also, as part of the allocation of the second job, the first job may be migrated between different physical GPUs if indicated by the solution provided by the solver 116. As shown in FIG. 2B, the first job may be migrated (at 216) from GPU 1 to GPU 2, such that the first job is allocated to L vGPUs of GPU 2. Also, the second job is allocated (at 214) to M vGPUs of GPU 2. The migration (216) of the first job may be performed if there are insufficient available vGPUs in GPU 1 to accommodate the M-vGPU requirement 204 of the second job. The solver 116 determines that the overall cost is minimized if the migration (216) of the first job is performed so that both the first and second jobs are allocated to vGPUs of GPU 2. This allocation allows GPU 1 and GPU N to be inactive (e.g., powered off, in a sleep state or another low power state, idle, etc.) to save on operational costs compared to powering on and activating both GPU 1 and GPU 2. After the allocation (214) of the second job and the migration (216) of the first job, GPU 1 has unallocated vGPUs 218, GPU 1 has unallocated vGPUs 206, GPU 2 has unallocated vGPUs 208, and GPU N has unallocated vGPUs 210. Note that after the allocation of the second job to vGPUs, GPUs 1 and N are unused and may be powered off.

In a different example, the solver 116 may determine that it is more costly to migrate the first job than if the first job were kept at GPU 1 and the second job is allocated vGPUs of another GPU, such as GPU 2 or GPU N. In this different example, the existing first job is allocated to L vGPUs of GPU 1, and the second job is allocated to M vGPUs of GPU 2 or N.

In either case, after the allocation of the second job, L+M vGPUs are in use.

Subsequently, as shown in FIG. 2C, the GPU scheduler 108 receives the job request 104-R from tenant 102-R to allocate a third job for processing by the GPUs of computing system 100. The third job has a requirement 222 of P vGPUs to perform the third job, where P is a natural number and is greater than or equal to 1. Assume also that the first job has been completed in the example of FIG. 2C.

In response to the job request 104-R, the GPU scheduler 108 allocates the third job to P vGPUs from the set of vGPUs 110, 112, or 114, while maintaining tenant isolation, satisfying the constraint that the second job cannot be allocated to more than one physical GPU, and minimizing the migration cost and operational cost for the computing system 102. Note that the allocation of the third job to vGPUs considers (1) that the first job has completed, and thus its L vGPUs can be freed for allocation to another job, and (2) the previously allocated M vGPUs allocated to the second job.

FIG. 2C shows that the GPU scheduler 108 has allocated (at 224) the third job to P vGPUs of GPU 2. After the allocation (224) of the second job to vGPUs of GPU 2, some GPUs may be unused and powered off (inactive), such as GPU 1 and GPU N. Also, as part of the allocation of the third job, the GPU scheduler 108 determines that migration of the second job between different physical GPUs does not have to be performed since there are sufficient vGPUs on GPU 2 to accommodate the third job. After the allocation (224) of the second job and the migration (216) of the first job, GPU 1 has unallocated vGPUs 206, GPU 2 has unallocated vGPU 208, and GPU N has unallocated vGPUs 210. Note that GPUs 1 and N are unused and can be powered off. After allocating the third job, M+P vGPUs are in use (since the first job has been completed).

In further examples, as the vGPUs of the GPUs are allocated, the unallocated vGPUs of the GPUs may not be sufficient to accommodate a new job with a specified requirement of Q vGPUs. In such an example, the GPU scheduler 108 can migrate job(s) between GPUs to free up available (unallocated) vGPUs to accommodate the new job.

The GPU scheduler 108 is iteratively invoked to allocate jobs to vGPUs in response to new job requests and/or completions of existing jobs. In some examples, the GPU scheduler 108 employs a bin-packing-based GPU scheduling technique that provides tenant isolation while minimizing operational and migration costs and satisfying any other objective(s) and/or constraint(s). In some examples, the GPU scheduling problem is a bin-packing problem where the bins are constrained (e.g., the minimum size of items in a bin is constant). For example, a bin can represent a vGPU, and an item can represent a job. In a bin-packing problem with constraints, the total combination of items in a bin is equal to $$R = \binom{M + K}{M},$$

(i.e., pack M items in a bin from K+1 different items. Next, we define the number of combinations of bins with R different bins to be P. The total combination of bins with R different bins is equal to $$P = \binom{n + R}{R} \le (n + R)^R = O(n^R),$$

which is bounded by a polynomial of n (number of bins). Therefore, the solution to the GPU scheduling problem, according to some examples of the present disclosure, can be solved in polynomial time.

The GPU scheduler 108 receives the following variables as input data: (1) the current set of jobs J (previously allocated job(s) and any new job(s) to be allocated) of tenants T and their respective requirements, $R_{it}$ (quantity of vGPUs required by each job i for tenant t, where the requirements may differ between different jobs); (2) previous allocation decisions $k_{ijt} \forall i, j, t$ (for all existing jobs i, GPUs j, and tenants t) (where $k_{ijt}$ is a binary variable that represents the previous decision of allocation of job i to GPU j for tenant t, e.g., $k_{ijt}=1$ if job i is allocated to GPU j for tenant t, and $k_{ijt}=0$ otherwise; (3) the weights $w_i \forall i$, for each job's migration cost; (4) weights for objective functions $\epsilon_1$, $\epsilon_2$ (where $\epsilon_1$ is the weight for the operational cost and $\epsilon_2$ is the weight for the migration cost); and (5) the total number of physical GPUs, N, in the computing system 100; and the capacity of each GPU in the computing system 100 (number of vGPUs of each GPU j): $c_j$.

The GPU scheduler 108 produces the following variables as output data: (1) a new decision variable $x_{ijt} \forall i, j, t$ of allocating all jobs (existing and new jobs) in the computing system 100 where $x_{ijt}$ is a binary variable representing the decision to allocate job i to GPU j for tenant t, and where $x_{ijt}$ is set to 1 if job i is allocated to GPU j for tenant t, and $x_{ijt}=0$ otherwise; (2) a binary variable $\delta_{it}$ that specifies if job i is to be migrated, where $\delta_{it}=1$ if job i from tenant t is to be migrated, and $\delta_{it}=0$ otherwise; (3) a binary decision $y_j \forall j$ to power GPU j on or not, where $y_j=1$ if GPU j is to be powered (or more generally, set to an active state), and $y_j=0$ otherwise; and (4) a binary tenant-job variable $A_{jt} \forall j, t$ (for all jobs and all tenants) that is based on summing all $x_{ijt}$ corresponding to whether jobs i have been assigned to GPU j for tenant t if $A_{jt}$ is set to 1 and 0 otherwise.

The GPU scheduler 108 implements the allocations of jobs to vGPUs based at least in part on the output data. The GPUs then process the jobs allocated to respective vGPUs.

Table 1 below summarizes the input and output variables according to some examples.

TABLE 1

| Variable | Explanation |
|---|---|
| J | An input variable (a vector) that represents the current set of jobs (previously allocated job(s) and any new job(s) to be allocated). |
| G | A set of GPUs (bins) in the system to place the jobs in. |
| T | An input variable (a vector) that represents the current set of tenants that have previously submitted jobs or is currently requesting allocation of resource to jobs. |
| $\epsilon_1$ | An input variable representing the weight (priority) that a system administrator or another entity can choose to give to a first objective function that minimizes the operational cost (the total number of GPUs which are powered on or more generally active). |
| $\epsilon_2$ | An input variable representing the weight (priority) that the system administrator or another entity can choose to give to a second objective function that minimizes the migration cost (of job migrations). |
| $y_j$ | An output variable that represents the decision to power on GPU j (or more generally to set GPU j active). |
| $\delta_{it}$ | An output variable that represents the descision to migrate job i for tenant t. |
| $w_{it}$ | An input variable representing the weight (priority) that the system administrator or another entity can give to job number i for tenant number t to specify the migration cost in the case that different jobs have different migration costs; for example, job x may have more data to be moved than job y in which case the weight $w_{xt}$ assigned to job x for tenant t may be greater than the weight $w_{yt}$ assigned job y for tenant t. |
| $R_{it}$ | An input variable (an integer) that represents the number of vGPUs required for each job i for tenant t. |
| $x_{ijt}$ | An output variable (a binary variable) that represents the descision to allocate job i to GPU j for tenant t. |

TABLE 1-continued

| Variable | Explanation |
|---|---|
| $B_j$ | An input variable (an integer) defining the number of vGPUs that exists in each physcial GPU j, which is chosen by the system administrator or another entity (depending on how the GPU j is divided into vGPUs). |
| $k_{ijt}$ | An input variable (a binary variable) that represents a previous decision of allocation of job i to GPU j for tenant t. |
| N | An input variable (an integer) defining the total number of physical GPUs in the computing system (i.e., \|G\| = N). |
| $A_{jt}$ | An output tenant-job variable (a binary variable) that is based on dividing the sum of all $x_{ijt}$ corresponding to whether jobs i have been assigned to GPU j for tenant t divided by N. |

Equation 1 and Constraints 1.a, 1.b, 1.c, 1.d, 1.e, 1.f, and 1.g below represent a formulation of the GPU allocation problem to be solved by the GPU scheduler 108 in combination with the solver 116.

Equation 1

$$\text{Min}\,\epsilon_1\sum_j y_j + \epsilon_2\sum_t\sum_i w_{it}\delta_{it}$$

Constraint 1.a $$\text{subject to }\sum_t\sum_j x_{ijt} = 1, \forall i \in [1, \ldots N],$$

Constraint 1.b $$\sum_j x_{ijt} \le R_{it}, \forall i \in [1, \ldots N], \forall t \in T,$$

Constraint 1.c $$\sum_t\sum_i R_{it}.x_{ijt} \le c_j y_j, \forall j \in G,$$

Constraint 1.d $$\delta_{it} = \frac{\sum_j(x_{ijt} + k_{ijt} - 2x_{ijt}k_{ijt})}{|G|}, \forall i \in [1, \ldots N], \forall t \text{ in } T$$

Constraint 1.e $$A_{jt} \ge \frac{\sum_i x_{ijt}}{N}, \forall j \in G, \forall t \in T,$$

Constraint 1.f $$\sum_t A_{jt} \le 1, \forall j \in G,$$

Constraint 1.g $$\delta_{it}, x_{ijt}, k_{ijt}, A_{jt}, y_j \in \{0, 1\}.$$

There are two objective functions in Equation 1: (i) the left-hand side $\epsilon_1\Sigma_j y_j$ represents the weighted operational cost for powering on (or more generally activating) GPUs in the computing system 100 as part of job allocations, biased by the weight $\epsilon_1$; and (ii) the right-hand side $\epsilon_2\Sigma_i w_{it}\delta_{it}$ represents the weighted migration cost to migrate jobs as part of the job allocations, biased by the weight $\epsilon_2$. Equation 1 seeks to minimize the weighted operational costs (the first objective function) and minimize the weighted migration costs (the second objective function).

Relative values of the weights $\epsilon_1$ and $\epsilon_2$ control whether Equation 1 prioritizes minimizing the operational or migration costs. If $\epsilon_1 > \epsilon_2$, then Equation 1 prioritizes minimizing the operational cost over the migration cost. On the other hand, if $\epsilon_1 < \epsilon_2$, then Equation 1 prioritizes minimizing the migration cost over the operational cost. Note that in some cases, $\epsilon_1$ can be set equal to $\epsilon_2$ to place equal priority on minimizing the operational cost and minimizing the migration cost. Moreover, the right-hand side of Equation 1 also uses weights $w_i$ to place different migration costs for different jobs.

Equation 1 seeks to first minimize the operational cost or migration cost, depending upon which of $\epsilon_1$ and $\epsilon_2$ is greater. For example, if $\epsilon_1$ is greater than $\epsilon_2$, Equation 1 minimizes the operational cost (first objective function) when finding solutions for allocating jobs of a tenant to GPUs. If multiple solutions exist, the second objective function is minimized to select from the multiple solutions.

On the other hand, if $\epsilon_2$ is greater than $\epsilon_1$, Equation 1 minimizes the migration cost (second objective function) when finding solutions for allocating jobs of a tenant to GPUs. If multiple solutions, the first objective function is minimized to select from the multiple solutions. In a specific example, if Equation 1 places a higher priority on minimizing the GPU migration cost and there exist two solutions that require the minimum possible job migration (for example, both solutions involve migrating one), then the second objective is applied to select from the two solutions. The first solution uses 5 GPUs, and the second solution uses 6 GPUs. In this example, minimizing the operation cost would dictate that the first solution is selected.

Constraint 1.a ensures that each job is scheduled on only one physical GPU. Constraint 1.b ensures that GPU resources (vGPUs) allocated to each job i of a tenant t is less than the requirement $R_{it}$ set forth in the job request. Constraint 1.c ensures that the total job allocation to each physical GPU should not exceed the total capacity ($c_j$) of the physical GPU j that is powered on ($y_j=1$). Constraint 1.d indicates that a migration of a job occurs when the new allocation is different from the current allocation using the following table.

TABLE 2

| $x_{ijt}$ | $k_{ijt}$ | $\delta_{it}$ |
|---|---|---|
| 0 | 0 | 0 |
| 1 | 1 | 0 |
| 0 | 1 | 1 |
| 1 | 0 | 1 |

In Table 2, $k_{ijt}$ represents a prior allocation of job i to GPU j for tenant t, and $x_{ijt}$ represents a decision of the GPU scheduler 108 for a current iteration of allocation job i to GPU j for tenant t. In Table 2, if $k_{ijt}=x_{ijt}$, then $\delta_{it}$ is set to 0 to indicate that job i is not to be migrated. However, if $k_{ijt}\ne x_{ijt}$, then $\delta_{it}$ is set to 1 to indicate that job i is to be migrated.

Constraint 1.e indicates if GPU j has been allocated to tenant t or not. This constraint combined with Constraint 1.f ensures tenant isolation, i.e., only one tenant can use a physical GPU at a time.

In Constraint 1.e, for each GPU j and for each tenant t, the GPU scheduler 108 sums the binary variable $x_{ijt}$ for all jobs that are allocated to GPU j and for each tenant t ($\Sigma_i x_{ijt}$). Note that $x_{ijt}=1$ if job i has been allocated to GPU j for tenant t, and $x_{ijt}=0$ if job i has not been allocated to GPU j for tenant t. According to Constraint 1.e, even if just one job that has been allocated to GPU j for tenant t, the summation of Constraint 1.e will be greater than 0. The sum ($\Sigma_i x_{ijt}$) for all jobs that are allocated to GPU j and for tenant t is divided by N to normalize the sum to a value in the range of 0 to 1. If the sum ($\Sigma_i x_{ijt}$) divided by N is 0, that indicates that no job for tenant t is assigned to GPU j. If the sum ($\Sigma_i x_{ijt}$) divided by N is greater than 0 (but less than or equal to 1), then Constraint 1.e sets the tenant-job variable $A_{jt}$ to 1.

Constraint 1.f then ensures that the tenant-job variable $A_{jt}$ is less than or equal to 1, which ensures that jobs for more than one tenant cannot be allocated to the same GPU j.

Constraint 1.g specifies that each of the following variables has a value in the range of 0 to 1: $\delta_{jt}$, $x_{ijt}$, $k_{ijt}$, $A_{jt}$, $y_j$.

By using online GPU scheduling techniques according to some implementations of the present disclosure allow for allocations of jobs of multiple tenants to shared physical GPUs while maintaining tenant isolation such that data leakage between tenants can be avoided and security between tenants is enhanced while satisfying other objective(s) and constraint(s). Data leakage may occur if multiple tenants share the same memory, which may occur if jobs of multiple tenants are assigned to the same physical GPU. The online GPU scheduling techniques are able to accommodate new jobs into a computing system with the shared physical GPUs if feasible. The online GPU scheduling techniques are also able to incrementally update vGPU assignments for existing jobs that were previously allocated, for satisfying various objectives and constraints. Additionally, in some examples, different weights (priorities) may be assigned to different objectives (e.g., the operational cost minimization objective and the migration cost minimization objective) to allow a modification of the GPU scheduling techniques. For example, the weights $\epsilon_1$ and $\epsilon_2$ can be modified to change a cost model, such as by an administrator or manager of a cloud including the physical GPUs, which prioritizes the operational cost minimization objective or the migration cost minimization objective.

Figure 3:
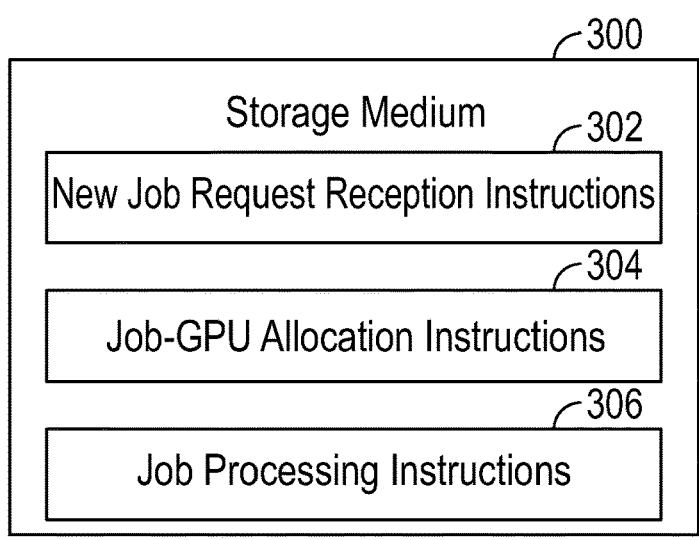
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can be a computing system with one or more computers, such as the computing system 100 of FIG. 1.

The machine-readable instructions include new job request reception instructions 302 to receive, in the system that includes physical GPUs, a request to schedule a new job to be executed in the system that is accessible by a plurality of tenants to use the physical GPUs.

The machine-readable instructions include job-GPU allocation instructions 304 to allocate the new job to a collection of vGPUs (a single vGPU or multiple vGPUs of the physical GPUs based on an operational cost reduction objective to reduce (e.g., minimize) a cost associated with the usage of the physical GPUs and based on a tenant isolation constraint to provide tenant isolation wherein a single tenant of the plurality of tenants is to use a physical GPU at a time. In some examples, the allocation can further be based on a migration cost reduction objective to reduce (e.g., minimize) a cost associated with migrating jobs between physical GPUs.

The machine-readable instructions include job processing instructions 306 to process the new job according to the allocation of the new job to the collection of vGPUs. In some examples, the processing of the new job according to the allocation of the new job to the collection of vGPUs can include a scheduler, such as the GPU scheduler 108 of FIG. 1, deploying the new job to the assigned vGPUs, such as by sending instructions, commands, etc., to a respective physical GPU to initiate execution of the new job on the physical GPU.

In some examples, the machine-readable instructions receive a first weight for the operational cost reduction objective associated with the usage of the physical GPUs, and a second weight for the migration cost reduction objective associated with migrating jobs between physical GPUs. In some examples, the first weight can be $\epsilon_1$, and the second weight can be $\epsilon_2$. The allocation of the new job to the collection of vGPUs is further based on the first and second weights.

In some examples, the tenant isolation constraint includes a tenant-job variable to indicate whether a respective physical GPU of the physical GPUs has been allocated to a respective tenant of the plurality of tenants. For example, the tenant-job variable is $A_{jt}$ in Constraints 1.e and 1.f.

In some examples, the tenant-job variable is based on variables (e.g., $x_{ijt}$) indicating whether corresponding jobs of the respective tenant have been allocated to the respective physical GPU.

In some examples, the tenant-job variable is based on a sum of the variables indicating whether corresponding jobs of the respective tenant have been allocated to the respective physical GPU. For example, in Constraint 1.e, the tenant-job variable is $A_{jt}$ is expressed as $$A_{jt} \geq \frac{\Sigma_i x_{ijt}}{N}.$$

In some examples, the tenant-job variable has a non-zero if any job of the respective tenant is assigned to the respective physical GPU. In some examples, the tenant isolation constraint is based on a sum of tenant-job variables across a set of tenants being less than a target value (e.g., $\Sigma_t A_{jt} \leq 1$ according to Constraint 1.f.

In some examples, the allocation of the new job to the collection of vGPUs is according to a GPU scheduling process that performs the allocation further based on allocations of existing jobs to vGPUs of the physical GPUs. In some examples, the GPU scheduling process updates the allocations of the existing jobs to one or more vGPUs.

Figure 4:
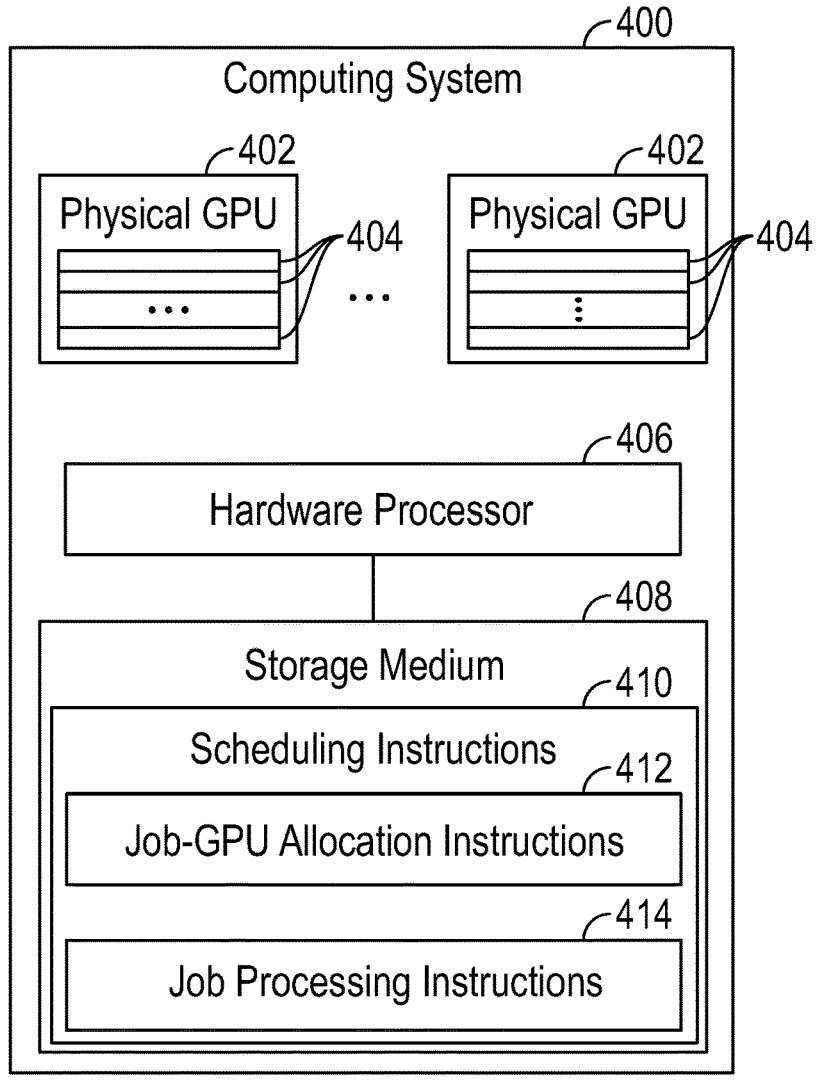
FIG. 4 is a computing system block diagram according to some examples.

FIG. 4 is a block diagram of a computing system 400 that includes multiple physical GPUs 402. Each physical GPU 402 is divided into a respective number of vGPUs 404. The computing system 400 includes a hardware processor 406 (or multiple hardware processors). A hardware processor can include a microprocessor, a core of a multi-core microprocessor, a microcontroller, a programmable integrated circuit, a programmable gate array, or another hardware processing circuit.

The computing system 400 further includes a storage medium 408 that stores scheduling instructions 410 executable on the hardware processor 406 to perform various tasks. The scheduling instructions 410 iteratively perform a job scheduling process to assign jobs associated with a plurality of tenants to vGPUs 404 of the physical GPUs 402. For example, the scheduling instructions 410 may be part of the GPU scheduler 108 of FIG. 1.

The scheduling instructions 410 include job-GPU allocation instructions 412 and job processing instructions 414 that are executable in each given iteration of the job scheduling process. The job-GPU allocation instructions 412 allocate a set of jobs to a collection of vGPUs 404 of the physical GPUs 402 based on a cost reduction objective to reduce a cost associated with the deployment of the set of jobs on the physical GPUs 402 and based on a tenant isolation constraint to provide tenant isolation where a single tenant of the plurality of tenants is to use a physical GPU at a time.

In some examples, the cost reduction objective includes one or more of an operational cost reduction objective to reduce a cost associated with the usage of the plurality of physical GPUs, and a migration cost reduction objective to reduce a cost associated with migrating jobs between physical GPUs.

The job processing instructions 414 process the set of jobs according to the allocation of the set of jobs to the collection of vGPUs. In some examples, each respective job of the set of jobs is associated with a requirement of a number of vGPUs for the execution of the respective job. The set of jobs can include a new job specified by a job request and an existing job previously allocated.

FIG. 5 is a flow diagram of a process 500 according to some examples. The process 500 includes receiving (at 502), in a computing system that includes physical GPUs, a request to schedule a new job to be executed in the computing system. The computing system is accessible by a plurality of tenants to use the physical GPUs.

The process 500 includes allocating (at 504) the new job and any existing job to vGPUs of the physical GPUs based on cost minimization objectives and based on a tenant isolation constraint to provide tenant isolation where a single tenant of the plurality of tenants is to use a physical GPU at a time. The cost minimization objectives include an operational cost reduction objective to minimize the cost associated with setting physical GPUs to an active state and a migration cost minimization objective to reduce the cost associated with migrating jobs between physical GPUs.

The process 500 includes processing (at 506) the new job and any existing job according to the allocation of the new job and any existing job to the vGPUs. The processing of the new job and any existing job may or may not include migration of the existing job between different physical GPUs, and may or may not include powering on or off a physical GPU based on the allocation.

A storage medium (e.g., 300 in FIG. 3 or 408 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium or, alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

In the present disclosure, the use of the term "a," "an," or "the" is intended to include the plural forms as well unless the context clearly indicates otherwise. Also, the term "includes," "including," "comprises," "comprising," "have," or "having" when used in this disclosure, specifies the presence of the stated elements but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions, which upon execution, cause a system to:

receive, in the system that includes physical graphics processing units (GPUs), a request to schedule a new job to be executed in the system that is accessible by a plurality of tenants to use the physical GPUs, the request being from a first tenant of the plurality of tenants, and wherein each of the physical GPUs is divided into a respective number of virtual GPUs (vGPUs);

receive a first weight for an operational cost reduction objective representing a weighted operational cost and associated with reducing a cost of usage of the physical GPUS;

receive a second weight for a migration cost reduction objective representing a weighted migration cost and associated with reducing a cost of migrating jobs between the physical GPUs; and execute the new job of the first tenant on a collection of vGPUs of a first physical GPU according to an allocation of the new job while maintaining tenant isolation between the new job on the first physical GPU and another job of a second tenant on a different physical GPU, wherein the allocation is based on the first weight of the operational cost reduction objective, the second weight of the migration cost reduction objective, and a tenant isolation constraint to provide the tenant isolation wherein a single tenant of the plurality of tenants is to use a physical GPU at a time, and wherein the allocation reduces the weighted operational cost and the weighted migration cost while satisfying the tenant isolation constraint.

2. The non-transitory machine-readable storage medium of claim 1, wherein the migration cost reduction objective comprises job weights assigning different migration costs for respective jobs and variables specifying whether the respective jobs are to be migrated.

3. The non-transitory machine-readable storage medium of claim 1, wherein the tenant isolation constraint comprises a tenant-job variable to indicate whether a respective physical GPU of the physical GPUs has been allocated to a respective tenant of the plurality of tenants.

4. The non-transitory machine-readable storage medium of claim 3, wherein the tenant-job variable is based on variables indicating whether corresponding jobs of the respective tenant have been allocated to the respective physical GPU.

5. The non-transitory machine-readable storage medium of claim 4, wherein the tenant-job variable is based on a sum of the variables indicating whether corresponding jobs of the respective tenant have been allocated to the respective physical GPU.

6. The non-transitory machine-readable storage medium of claim 5, wherein the tenant-job variable is set to 1 if any job of the respective tenant is assigned to the respective physical GPU.

7. The non-transitory machine-readable storage medium of claim 6, wherein the tenant isolation constraint is based on a sum of tenant-job variables across a set of tenants being less than a target value.

8. The non-transitory machine-readable storage medium of claim 1, wherein the allocation of the new job to the collection of vGPUs is according to a GPU scheduling process that is based on allocations of existing jobs to vGPUs of the physical GPUs.

9. The non-transitory machine-readable storage medium of claim 8, wherein the GPU scheduling process is further based on the operational cost reduction objective to reduce the cost of usage of the physical GPUs by the new job and the existing jobs and based on the tenant isolation constraint that considers which physical GPUs have been assigned to which tenants of the plurality of tenants for the existing jobs.

10. The non-transitory machine-readable storage medium of claim 8, wherein updated allocations of the existing jobs to one or more vGPUs are based on the GPU scheduling process.

11. The non-transitory machine-readable storage medium of claim 1, wherein the tenant isolation constraint prevents multiple tenants from sharing any physical GPU.

12. The non-transitory machine-readable storage medium of claim 1, wherein the allocation of the new job to the collection of vGPUs is according to a bin-packing GPU scheduling process.

13. The non-transitory machine-readable storage medium of claim 1, wherein the cost of usage of the physical GPUs is associated with a variable that is set to a first value if a respective physical GPU of the physical GPUs is active, and a second value if the respective physical GPU is inactive.

14. A computing system comprising:
a plurality of physical graphics processing units (GPUs), wherein each physical GPU of the plurality of physical GPUs is divided into a respective number of virtual GPUs (vGPUs);
a hardware processor; and
a non-transitory storage medium storing instructions executable on the hardware processor to:
receive a request to schedule a new job to be executed in the computing system that is accessible by a plurality of tenants to use the plurality of physical GPUs, the request being from a first tenant of the plurality of tenants;
receive a first weight for an operational cost reduction objective representing a weighted operational cost and associated with reducing a cost of usage of the physical GPUs;
receive a second weight for a migration cost reduction objective representing a weighted migration cost and associated with reducing a cost of migrating jobs between the physical GPUs; and execute the new job of the first tenant on a collection of vGPUs of a first physical GPU according to an allocation of the new job while maintaining tenant isolation between the new job on the first physical GPU and another job of a second tenant on a different physical GPU, wherein the allocation is based on the first weight of the operational cost reduction objective, the second weight of the migration cost reduction objective, and a tenant isolation constraint to provide the tenant isolation wherein a single tenant of the plurality of tenants is to use a physical GPU at a time, and wherein the allocation reduces the weighted operational cost and the weighted migration cost while satisfying the tenant isolation constraint.

15. The computing system of claim 14, wherein:
the allocation of the new job is based on an iteration of an iterative scheduling process,
an allocation of a set of jobs associated with the plurality of tenants to vGPUs of the plurality of physical GPUs is based on the iterative scheduling process, and
each respective job of the set of jobs is associated with a requirement of a quantity of vGPUs for execution of the respective job.

16. The computing system of claim 14, wherein the migration cost reduction objective comprises job weights assigning different migration costs for respective jobs and variables specifying whether the respective jobs are to be migrated.

17. A method comprising:
receiving, in a computing system that includes physical graphics processing units (GPUs), a request to schedule a new job to be executed in the computing system that is accessible by a plurality of tenants to use the physical GPUs, the request being from a first tenant of the plurality of tenants, and wherein each of the physical GPUs is divided into a respective number of virtual GPUs (vGPUs);
receiving a first weight for an operational cost reduction objective representing a weighted operational cost and associated with reducing a cost of usage of the physical GPUS;
receiving a second weight for a migration cost reduction objective representing a weighted migration cost and associated with reducing a cost of migrating jobs between the physical GPUs; and
executing the new job of the first tenant on a collection of vGPUs of a first physical GPU according to an allocation of the new job while maintaining tenant isolation between the new job on the first physical GPU and another job of a second tenant on a different physical GPU, wherein the allocation is based on the first weight of the operational cost reduction objective, the second weight of the migration cost reduction objective, and a tenant isolation constraint to provide the tenant isolation wherein a single tenant of the plurality of tenants is to use a physical GPU at a time, and wherein the allocation reduces the weighted operational cost and the weighted migration cost while satisfying the tenant isolation constraint.

18. The method of claim 17, wherein the tenant isolation constraint is based on a tenant-job variable indicating whether a respective physical GPU of the physical GPUs has been allocated to a respective tenant of the plurality of tenants.

* * * * *